United States Patent Office 3,535,271

Patented Oct. 20, 1970

3,535,271

PREPARATION OF NICKEL-COPPER CATALYST

Olin M. Fuller, St. Lambert, Quebec, Canada, assignor to General Electric Company, a corporation of New York No Drawing. Filed Mar. 4, 1968, Ser. No. 709,889
Int. Cl. B01j *11/34, 11/40*
U.S. Cl. 252—452 6 Claims

ABSTRACT OF THE DISCLOSURE

The preparation of an improved nickel-copper catalyst is described wherein (1) an emulsified water-insoluble organic liquid having a vapor pressure lower than water is included in either a hydrosol or in an aqueous solution of soluble metal salts, (2) the hydrosol and the aqueous solution are mixed together to form a hydrogel from which the water is removed by drying, and (3) after water removal, the included droplets of the organic liquid are dispelled from the dried gel leaving behind macroscopic channels to the interior of each catalyst grain. A dehydrogenation catalyst prepared by this method employing a silica hydrosol, a xylene emulsion and an aqueous solution of nickel sulfate, copper sulfate with a potassium chromium sulfate promoter, showed significantly improved performance in the production of phenol from a cyclohexanol-cyclohexanone mixture as compared to a catalyst prepared by the same method except for the presence of the water-insoluble organic liquid (xylene).

BACKGROUND OF THE INVENTION

Gel catalysts for use in cracking, reforming, polymerization, isomerization, alkylation, dehydrogenation and similar treating processes have been prepared by various procedures. One method, which has been employed is (1) to prepare a silica hydrogel by mixing an alkali silicate with an acid, (2) the hydrosol may then either be impregnated with a soluble salt of some desired active metal or the hydrosol may be allowed to gel, the resulting hydrogel being washed and then soaked in a solution comprising a salt of the desired metal or metals. Thereafter, the hydrogel is subdivided and dried.

In another method a porous silica gel is (1) subdivided and reduced by heating to small particles, (2) the pores thereof are partially filled with a liquid, which is chemically unreactive with the silica gel, (3) the balance of the pore voids are impregnated with a solution of a metal salt and (4) the wet impregnated catalyst is then dried removing both the solvent and the liquid used to partially fill the pores leaving behind a so-called egg-shell catalyst.

A more common approach is to employ a porous, ceramically bonded silica as a catalyst carrier refluxing a solution of metal salts (nitrates or sulfates) over the silica and then driving off the solvent. Thereafter, the catalyst is heated and reduced in a stream of hydrogen before use.

In still another known method a gel-type inorganic oxide is precipitated from a solution containing a controlled amount of dissolved or dispersed high molecular weight ($1\times10^3$ to $1\times10^7$) combustible organic material so that the organic material becomes occluded within the gel structure and this organic material is later removed during drying and calcining of the gel structure. Such preparation of a gel-type inorganic oxide catalyst is described in British Pat. 708,957 published May 12, 1954. In the British patent specification (page 3, lines 59–64), it is stated that "It has been ascertained that organic materials possessing a molecular weight below $1\times10^3$, such as simple sugars and the like, do not effect any material improvement in the available catalystic surfaces of the inorganic gel catalysts."

Contrary to the above teaching it has been found that by including in the sol prior to gel precipitation an organic liquid not soluble in water having a molecular weight between about 100 and 500 and having a vapor pressure less than that of water a high performance dehydrogenation catalyst is produced for the conversion of cyclohexanol-cyclohexanone mixtures to yield phenol.

DEFINITIONS

Selectivity—the preferential activity of a catalyst for a specified reaction;

Porosity—the ratio of internal void space within the peripheral boundary surface of a particle to the total volume within this surface;

Crushing strength—the load needed to collapse a single catalyst particle; this value can be determined with any of a variety of types of apparatus, for example, one method automatically feeds shot into a pan at one end of a lever with a knife-edge fulcrum whereby at the other end of the lever increasing load is applied to the catalyst particle placed between two parallel plates until the particle collapses; collapse of the particle automatically cuts off the shot feed; at least 50 determinations should be made to obtain a reliable average;

Carrier—a physical support for a catalylst deposited and dispersed on its external and/or internal surface;

Specific surface area—the surface area per unit weight of a carrier or catalyst.

SUMMARY OF THE INVENTION

The improved nickel-copper dehydrogenation catalyst of this invention is prepared by gelling a hydrosol containing the active materials and an emulsion of an organic liquid in an alkaline solution, the organic liquid having a molecular weight ranging between 100 and 500 and having a vapor pressure lower than that of water, separating the mass of gel into small pieces, drying the gel pieces by slow heating in air causing the gel particles to shrink considerably in volume to form small very hard solid particles, or grains, continuing heating in an inert atmosphere saturated with water vapor (at room temperature) to a high temperature and activating the catalyst grains by exposure to a reducing gas, such as hydrogen for example, at an elevated temperature. The first drying step removes the water and subsequent higher temperature drying removes the organic liquid droplets dispersed through the catalyst grains.

DESCRIPTION OF THE PREFERRED EMBODIMENT

Objects and advantages of this invention will be readily appreciated as the same becomes better understood by reference to the following description of the preferred embodiment and application of this invention.

An alkaline silica hydrosol is prepared by adding either finely divided, particulate silica or a nearly neutral silica sol to a solution of aqueous sodium hydroxide. An emulsion of xylene in water is prepared by adding triethanolamine an oleic acid to the water and agitating the mixture. The emulsion is then mixed with the alkaline silica sol. An aqueous solution of nickel sulfate, copper sulfate and potassium chromium sulfate (chrome alum) is prepared and enough sulfuric acid is added thereto to make the amount of sulfate ions in this solution equivalent to the sum of the amounts of sodium and potassium ions in the silica hydrosol and sulfate salt solution. The silica sol, containing emulsified xylene, and the sulfate salt solution are rapidly and simultaneously added to a vigorously agitated vessel. After combination of these materials a gel is produced, which is later dried very slowly at a low temperature (above about 150° F.) to dehydrate the gel. It has been found that there is no need for washing or leaching of this gel.

The amount of xylene, mineral oil, naphthalene or other pore-former organic liquid to be added in the form of an emulsion (droplets greater than about 1 micron) should be in the range of from about 0.1 to about 0.5 cc. of pore-former per gram of solid material composing the catalyst. In the instant case, 0.5 cc. of xylene was added per gram of solids and the catalyst grains finally produced had a porosity of at least 0.7 with an acceptable crushing strength. After removal of the water, the partially dried gel is heated at a temperature high enough to boil and/or decompose the liquid pore-former. In the case of xylene the second heating would be conducted at a temperature above 138° C. when carried on in air at one atmosphere. Calcining is accomplished by subjecting the dry solid to a flow of nitrogen saturated (at room temperature) with water vapor. Over a period of 6 hours, the temperature is gradually raised to about 450° C. and is held there for 2 hours. The calcined catalyst is then cooled in a flow of dry nitrogen, after which it may be activated by reduction in a flow of hydrogen gas at 400 to 450° C. for a period of about 4 hours.

A comparison was made between the catalyst of this invention and a similar catalyst prepared without utilization of the organic pore-forming liquid. The improved catalyst of this invention had a specific surface area of 106 $m.^2$/gm. and a porosity of 73 percent. After regeneration, this material gave a phenol yield of 98.4 percent and a selectivity of 99.7 percent at a feed rate of 1.0 ml./(bl. bed) (hr.). At a comparable temperature, the catalyst prepared without pore-former had a specific surface area of 176 $m.^2$/gm. and a porosity of 61 percent and gave a phenol yield of 91.1 percent and a selectivity of 99.5 percent at a feed rate of 0.96 ml./ml. (bed) (hr.).

The object of introducing macroscopic (greater than about 1 micron) droplets of pore-former is to increase porosity in a particular manner. By the practice of this invention there is created a network of macroscopic pores in addition to the microscopic pores produced in gel-type catalysts in the absence of using pore-forming additives. It is believed that the increased performance provided by the gel-type catalysts prepared in accordance with this invention is due to the increased accessibility of the gaseous reactants to the interior of each catalyst grain without substantial decrease in the transfer of heat to the catalyst grain interiors.

Too much pore-former should not be added to the system as the resistance of the catalyst grains to crushing may be too greatly reduced. Because of the predominately physical nature of the modification produced, the optimum amount of a given water insoluble pore-forming organic liquid in dispersed macroscopic droplets may be readily ascertained by preparing several batches of gel catalyst each with a different amount of pore-former. Simple crushing tests will indicate the maximum amount of pore-former liquid which may be used.

Similar gel catalysts have been prepared using mineral oil as the pore-former liquid and catalyst have been prepared using platinum as a promoter. In each case an improved nickel-copper catalyst has resulted. The use of sulfate salts rather than nitrates eliminated the possibility of forming ammonium nitrate, as it has been found that even very small amounts of this compound present in catalyst grains can decompose with sufficient violence to rupture the catalyst grains.

Attempts to produce the same results by employing a water-soluble polymer in place of the emulsified organic liquid of this invention resulted in a porous catalyst structure of porosity of greater than about 0.7, but of such considerably reduced strength as to make the catalyst grains commercially unuseable.

What I claim as new and desire to secure by Letters Patent of the United States is:

1. A process for the preparation of a gel-type inorganic oxide catalyst comprising the steps of:

(a) agitating an aqueous medium containing in combination a metal oxide hydrosol, an emulsified water-insoluble organic liquid present in macroscopic droplets and a solution of a plurality of catalyst metal salts to form a composite gel phase, said organic liquid having a molecular weight between about 100 and 500 and having a vapor pressure less than that of water, (b) subdividing said composite gel phase, (c) heating said subdivided composite gel phase in air at a low temperature in excess of about 150° F. to slowly dehydrate said subdivided composite gel phase to form solid particles, (d) heating said solid particles in an inert atmosphere having sufficient water vapor content to be saturated at room temperature, said heating being conducted at a temperature high enough to boil and/or decompose said organic liquid, and (e) heating the solid particles free of organic liquid content in a reducing environment to activate the catalyst metal content.

2. The process as recited in claim 1 wherein nickel and copper salts are coprecipitated with and interspersed through the composite gel phase.

3. The process as recited in claim 1 wherein the organic liquid is xylene.

4. The process as recited in claim 1 wherein the amount of organic liquid is between about 0.1 and 0.5 cc. per gram of the solid gel catalyst constituents.

5. The process as recited in claim 1 wherein the gel phase is silica gel.

6. The process as recited in claim 1 wherein the organic liquid is xylene and the gel phase is silica gel.

References Cited

UNITED STATES PATENTS

| | | | |
|---|---|---|---|
| 1,797,804 | 3/1931 | Stoewener | 252—451 |
| 2,697,066 | 12/1954 | Sieg | 252—451 X |
| 2,763,603 | 9/1956 | Skinner | 252—452 X |
| 3,067,128 | 12/1962 | Kimberlin, et al. | 208—138 |
| 3,342,751 | 9/1967 | Hayes | 252—451 X |

PATRICK P. GARVIN, Primary Examiner

C. F. DEES, Assistant Examiner

U.S. Cl. X.R.

252—454, 477